(12) United States Patent
Yu et al.

(10) Patent No.: US 10,126,865 B2
(45) Date of Patent: Nov. 13, 2018

(54) TOUCH CONTROL DISPLAY PANEL AND DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Renhui Yu, Xiamen (CN); Wenyuan Xi, Xiamen (CN); Jiancai Huang, Xiamen (CN); Yumin Xu, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

(*) Notice: Subject to any disclaimer, the term of this patent is extended or adjusted under 35 U.S.C. 154(b) by 100 days.

(21) Appl. No.: 15/385,679

(22) Filed: Dec. 20, 2016

(65) Prior Publication Data

US 2017/0102820 A1   Apr. 13, 2017

(30) Foreign Application Priority Data

Aug. 11, 2016   (CN) .......................... 2016 1 0665069

(51) Int. Cl.
 *G06F 3/041* (2006.01)
 *G06F 3/044* (2006.01)
(52) U.S. Cl.
 CPC ............ *G06F 3/0416* (2013.01); *G06F 3/044* (2013.01); *G06F 3/0412* (2013.01)

(58) Field of Classification Search
 CPC ....... G06F 3/0416; G06F 3/0412; G06F 3/044
 See application file for complete search history.

(56) References Cited

U.S. PATENT DOCUMENTS

| | | | | |
|---|---|---|---|---|
| 8,860,690 | B2* | 10/2014 | Trend ...................... | G06F 3/044 |
| | | | | 345/174 |
| 9,304,640 | B2* | 4/2016 | Teranishi ................ | G06F 3/044 |
| 9,323,092 | B2* | 4/2016 | Lo ........................... | G06F 3/044 |
| 9,626,045 | B1* | 4/2017 | Yilmaz ................... | G06F 3/044 |
| 9,632,628 | B2* | 4/2017 | Philipp ................... | G06F 3/044 |
| 9,766,746 | B2* | 9/2017 | Teranishi ................ | G06F 3/044 |
| 9,785,297 | B2* | 10/2017 | Kawaguchi ............. | G06F 3/044 |
| 9,869,706 | B2* | 1/2018 | Lock ....................... | G06F 3/044 |
| 9,916,045 | B2* | 3/2018 | Yilmaz ................... | G06F 3/044 |
| 2010/0026655 | A1* | 2/2010 | Harley .................... | G06F 3/044 |
| | | | | 345/174 |

(Continued)

*Primary Examiner* — Peter D McLoone
(74) *Attorney, Agent, or Firm* — Anova Law Group, PLLC

(57) ABSTRACT

A touch control display panel and a display device are provided. The touch control display panel may comprise a first touch control electrode array including a plurality of first sub-electrodes arranged in an M1×N1 array and a plurality of first connectors, and a second touch control electrode array including a plurality of second sub-electrodes arranged in an M2×N2 array and a plurality of second connectors, where M1, M2, N1, and N2 is a positive integer, respectively. The first control electrode array and the second control electrode array are configured to satisfy at least one of: in the first direction, a width of the first sub-electrode being larger than a width of the first connector, and in the second direction, a width of the second sub-electrode being larger than a width of the second connector.

19 Claims, 13 Drawing Sheets

(56) References Cited

U.S. PATENT DOCUMENTS

| | | | |
|---|---|---|---|
| 2011/0095990 A1* | 4/2011 | Philipp | G06F 3/044 345/173 |
| 2011/0096016 A1* | 4/2011 | Yilmaz | G06F 3/044 345/174 |
| 2013/0106702 A1* | 5/2013 | Chen | G06F 3/0416 345/168 |
| 2013/0154995 A1* | 6/2013 | Trend | G06F 3/044 345/174 |
| 2014/0022466 A1* | 1/2014 | Lo | G06F 3/044 349/12 |
| 2014/0218335 A1* | 8/2014 | Teranishi | G06F 3/044 345/174 |
| 2014/0266261 A1* | 9/2014 | Lock | G06F 3/044 324/686 |
| 2015/0277626 A1* | 10/2015 | Shinkai | G06F 3/044 345/174 |
| 2015/0363023 A1* | 12/2015 | Kawaguchi | G06F 3/044 345/174 |
| 2016/0188100 A1* | 6/2016 | Teranishi | G06F 3/044 345/174 |
| 2016/0291735 A1* | 10/2016 | Nakanishi | G06F 3/044 |
| 2017/0153763 A1* | 6/2017 | Vavra | G06F 3/0488 |
| 2018/0052544 A1* | 2/2018 | Han | G01L 1/14 |

* cited by examiner

US 10,126,865 B2

TOUCH CONTROL DISPLAY PANEL AND DISPLAY DEVICE

CROSS-REFERENCES TO RELATED APPLICATIONS

This application claims priority of Chinese Patent Application No. 201610655069.7, filed on Aug. 11, 2016, the entire contents of which are hereby incorporated by reference.

BACKGROUND

Touch control display devices are able to detect the coordinates of a touch position on a screen by a finger, stylus, or other object, and to display corresponding information according to the detected coordinates. Touch control display devices enable users to interact directly with what is displayed, rather than using a mouse, touchpad, or any other intermediate devices, and, thus, have found wide applications in game consoles, personal computers, tablet computers, electronic voting machines, and smartphones, etc.

A current touch control display panel often includes a plurality of touch sensing electrodes and a plurality of touch driving electrodes intersecting the touch sensing electrodes. A capacitor is formed in an intersection area between the touch driving electrode and the touch sensing electrode, and a touch position is identified by detecting a capacitance change. The touch driving electrodes and the touch sensing electrodes are often made of transparent conductive glasses, such as indium tin oxide (ITO). However, due to a substantially large self-resistance of ITO, the touch sensitivity of the touch control display panel may be substantially poor.

Further, the intersection area between the touch driving electrode and the touch sensing electrode may be substantially small compared to the touch driving electrode and the touch sensing electrode themselves. Thus, given a fixed area of the touch driving electrode and the touch sensing electrode, the number of the capacitors for detecting the touch positions may be rather limited, and the touch accuracy of the touch control display panel may be low.

The disclosed touch control display panel and display device thereof are directed to solve one or more problems set forth above and other problems.

BRIEF SUMMARY OF THE DISCLOSURE

One aspect of the present disclosure provides a touch control display panel. The touch control display panel may comprise a first touch control electrode array including a plurality of first sub-electrodes arranged in an M1×N1 array and a plurality of first connectors, wherein the first touch control electrode array includes a plurality of first touch control electrodes arranged in a first direction, a first connector connects the first sub-electrodes in the $j^{th}$ column to form the $j^{th}$ first touch control electrode in the first touch control electrode array, where j is a positive integer and $1 \leq j \leq N1$; and a second touch control electrode array including a plurality of second sub-electrodes arranged in an M2×N2 array and a plurality of second connectors, wherein the second touch control electrode array includes a plurality of second touch control electrodes arranged in a second direction, and a second connector connects the second sub-electrodes in the $i^{th}$ row to form the $i^{th}$ second touch control electrode in the second touch control electrode array, where i is a positive integer and $1 \leq i \leq M2$, M1, M2, N1, and N2 is a positive integer, respectively. The first control electrode array and the second control electrode array are configured to satisfy at least one of: in the first direction, a width of the first sub-electrode being larger than a width of the first connector, and in the second direction, a width of the second sub-electrode being larger than a width of the second connector.

Another aspect of the present disclosure provides a display device including a touch control display panel. The touch control display panel may comprise a first touch control electrode array including a plurality of first sub-electrodes arranged in an M1×N1 array and a plurality of first connectors, wherein the first touch control electrode array includes a plurality of first touch control electrodes arranged in a first direction, a first connector connects the first sub-electrodes in the $j^{th}$ column to form the $j^{th}$ first touch control electrode in the first touch control electrode array, where j is a positive integer and $1 \leq j \leq N1$; and a second touch control electrode array including a plurality of second sub-electrodes arranged in an M2×N2 array and a plurality of second connectors, wherein the second touch control electrode array includes a plurality of second touch control electrodes arranged in a second direction, and a second connector connects the second sub-electrodes in the $i^{th}$ row to form the $i^{th}$ second touch control electrode in the second touch control electrode array, where i is a positive integer and $1 \leq i \leq M2$, M1, M2, N1, and N2 is a positive integer, respectively. The first control electrode array and the second control electrode array are configured to satisfy at least one of: in the first direction, a width of the first sub-electrode being larger than a width of the first connector, and in the second direction, a width of the second sub-electrode being larger than a width of the second connector.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
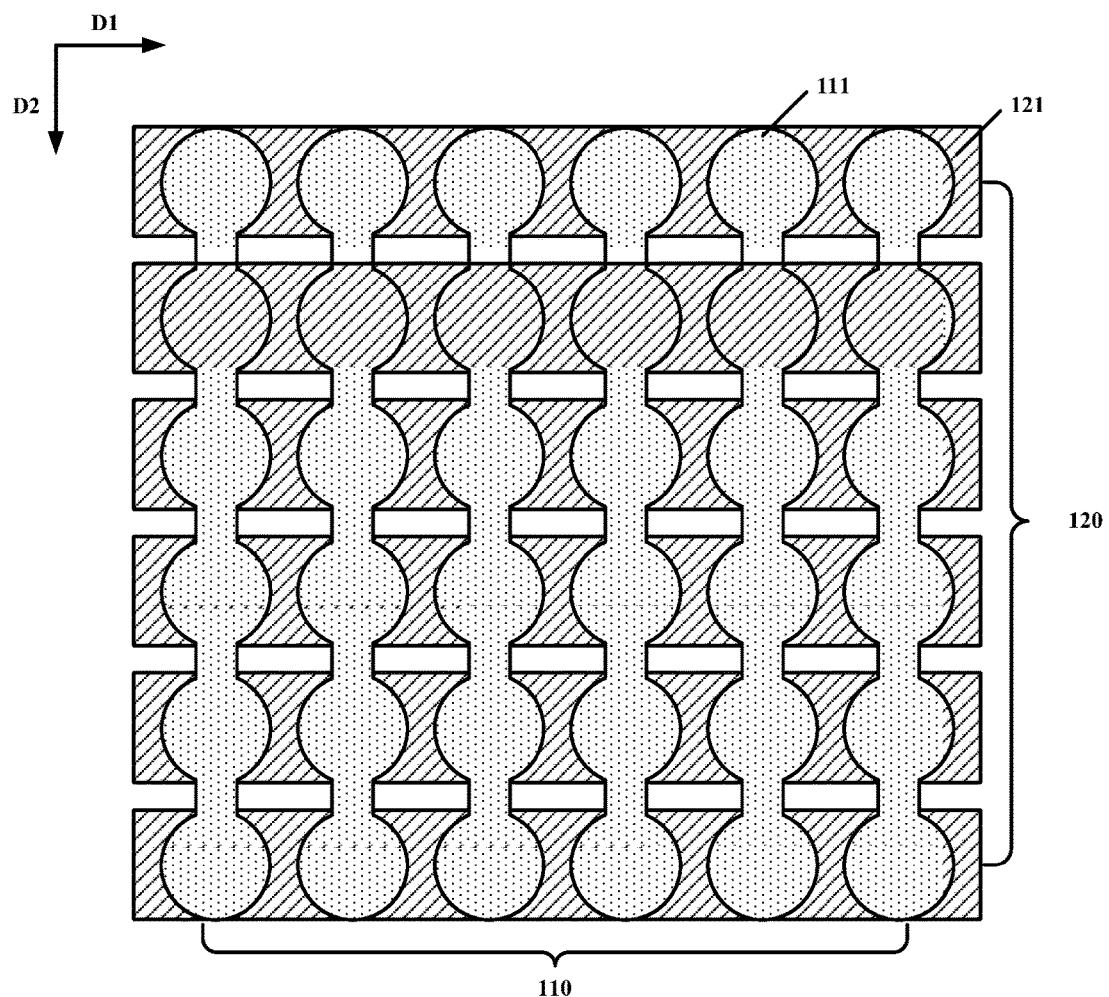
FIG. 1 illustrates an exemplary arrangement of a first touch control electrode array and a second touch control electrode array in an exemplary touch control display panel consistent with disclosed embodiments.

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

A current touch control display panel often includes two touch control electrode layers, each of which includes touch control electrode layer includes a plurality of touch control electrodes arranged in parallel. The touch control electrodes in one touch control electrode layer are perpendicular to the touch control electrodes in the other touch control electrode layer. A capacitor is formed in an intersection area between the touch driving electrodes in the two ouch control electrode layers.

When a touch controlling signal is applied to the touch control electrodes and the touchscreen is pressed or tapped by a finger, a capacitance change is introduced, and an electrical current is generated accordingly. Through detecting the electrical current, a touch sensing circuit identifies two perpendicular touch control electrodes where the capacitance changes and, thus, determines the point at which the touch occurs.

In the current touch control display panel, one of the two touch control electrode layers is a touch driving electrode layer including a plurality of touch driving electrodes, and the other touch control electrode layer is a touch sensing electrode layer including a plurality of touch sensing electrodes. The touch driving electrodes and touch sensing electrodes are often made of transparent conductive glasses, such as indium tin oxide (ITO). However, ITO has a substantially large self-resistance, resulting a poor touch sensitivity. When the size of the touch control display panel keeps increasing, the resistance of the touch driving electrodes and the touch sensing electrodes may be further increased and, thus, the touch sensitivity of the touch control display panel may be further degraded.

Further, the intersection area between the touch driving electrode and the touch sensing electrode is a substantially small as compared to the touch driving electrode and the touch sensing electrode. Thus, given a fixed area of the touch driving electrode and the touch sensing electrode, i.e., given a fixed display region of the touch control display panel, the number of the capacitors used for detecting touch positions may be limited, and the touch accuracy may be poor accordingly.

The present disclosure provides an improved touch control display panel, in which the intersection areas between the touch control electrodes in the two touch control electrode layers may be expanded, while the non-intersection areas may be reduced. Thus, given a fixed area of the display region in the touch control display panel, the number of the capacitors used for detecting touch positions may be further increased. Accordingly, the touch accuracy may be improved.

Figure 2:
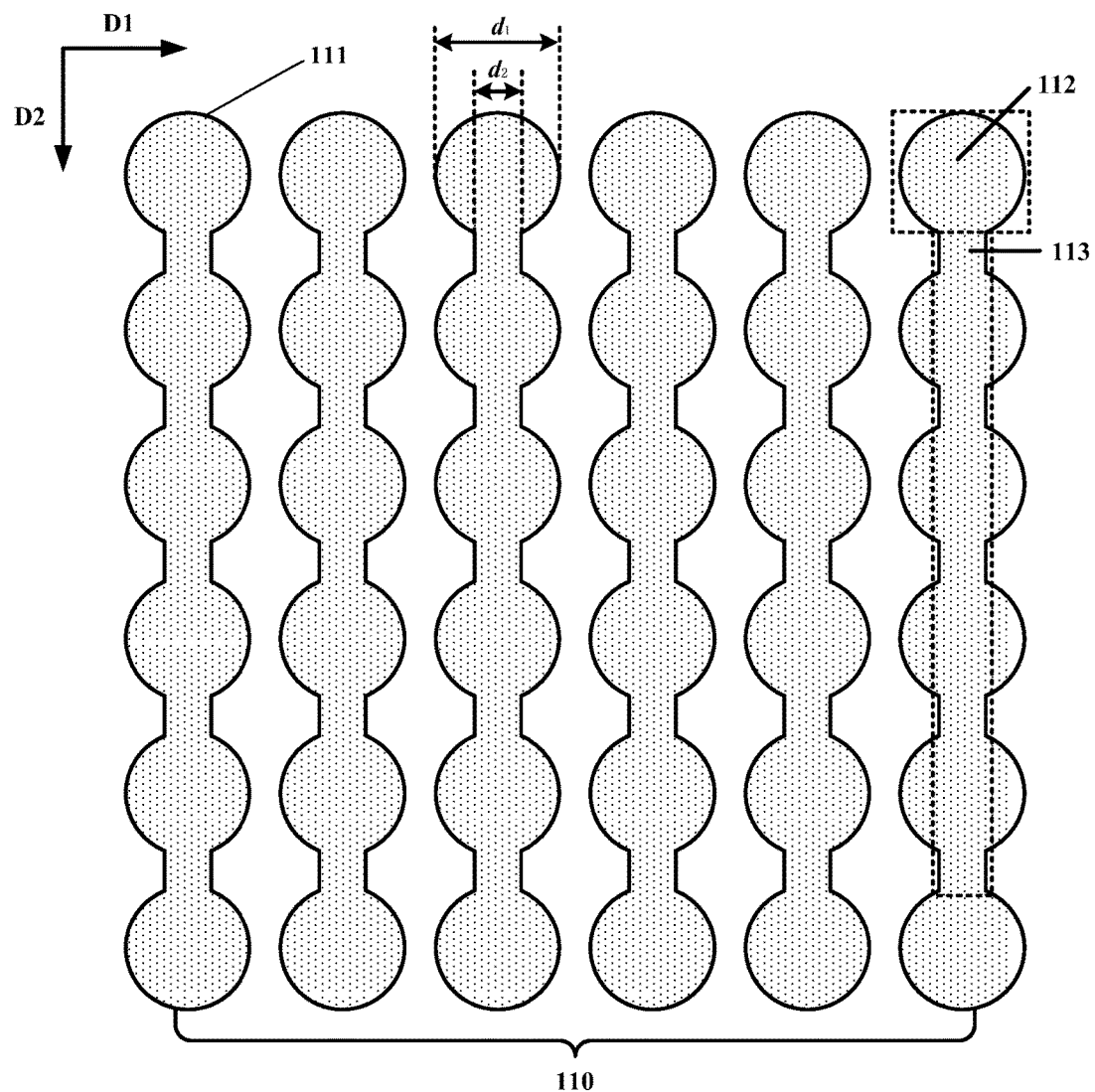
FIG. 2 illustrates a top view of an exemplary first touch control electrode array in FIG. 1 consistent with disclosed embodiments.
Figure 3:
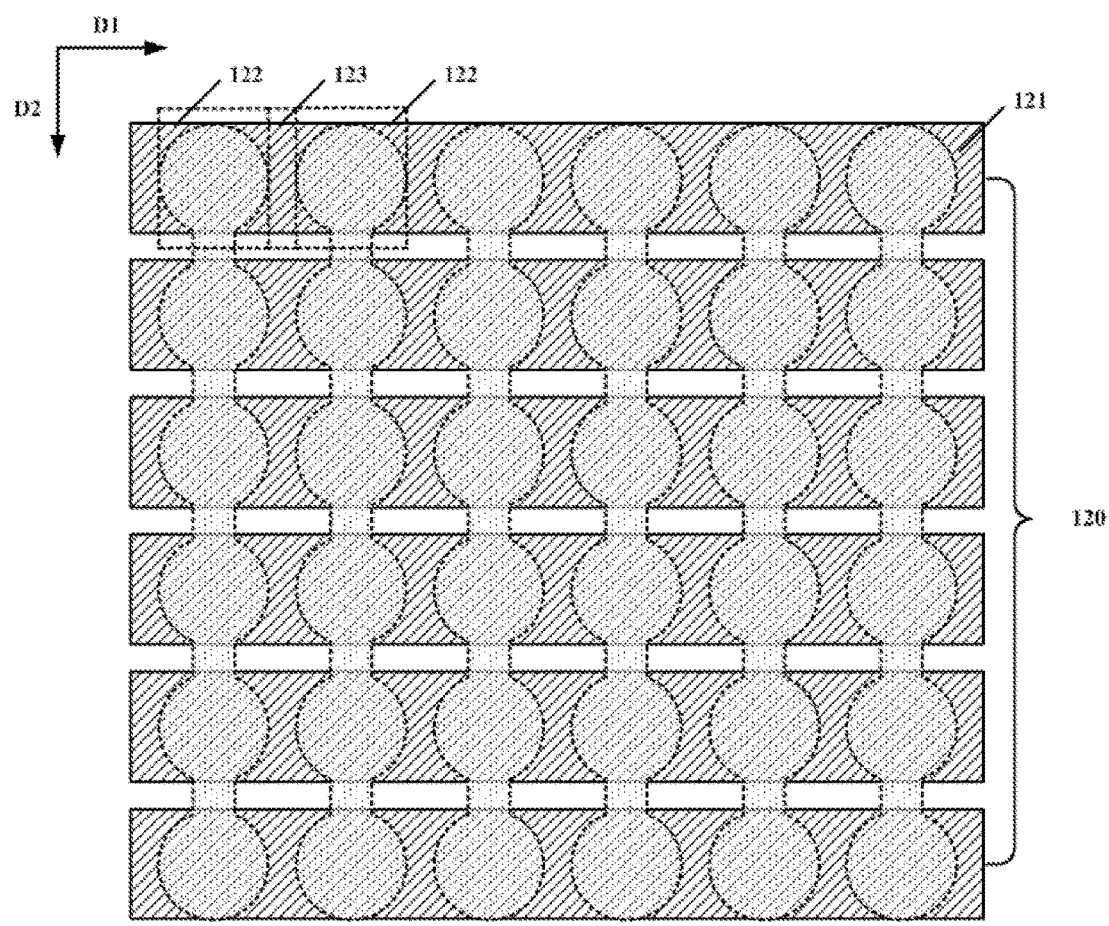
FIG. 3 illustrates a top view of an exemplary second touch control electrode array in FIG. 1 consistent with disclosed embodiments.

FIG. 1 illustrates an exemplary arrangement of a first touch control electrode array and a second touch control electrode array in an exemplary touch control display panel consistent with disclosed embodiments. FIG. 2 illustrates a top view of an exemplary first touch control electrode array in FIG. 1 consistent with disclosed embodiments. FIG. 3 illustrates a top view of an exemplary second touch control electrode array in FIG. 1 consistent with disclosed embodiments.

As shown in FIG. 1, the touch control panel display may include a first touch control electrode array 110 and a second touch control electrode array 120. The first touch control electrode array 110 may include a plurality of first touch control electrodes 111 arranged in a first direction D1. The second touch control electrode array 120 may include a plurality of second touch control electrodes 121 arranged in a second direction D2. The first touch control electrodes 111 may be arranged in parallel, and the second touch control electrodes 121 may also be arranged in parallel.

As shown in FIG. 2, the first touch control electrode array may include a plurality of first sub-electrodes 112 arranged in an M1×N1 array and a plurality of first connectors 113. Each first connector 113 may connect the first sub-electrodes 112 in the $j^{th}$ column to form the $j^{th}$ first touch control electrode 111 in the first touch control electrode array 110, where j is a positive integer and $1 \leq j \leq N1$. That is, the number of the first connectors 113 in the first touch control electrode array 110 may be N1. Each first connector 113 connecting the first sub-electrodes 112 in the $j_{th}$ column may be a straight line having a certain width, i.e., may have a rectangular shape. In particular, in the first direction D1, the width $d_1$ of the first sub-electrode 112 may be larger than the width $d_2$ of the first connector 113, i.e., $d_1 > d_2$.

As shown in FIG. 3, the second touch control electrode array may include a plurality of second sub-electrodes 122 arranged in an M2×N2 array and a plurality of second connectors 123. Each second connector 123 may connect the second sub-electrodes 122 in the $i^{th}$ row to form the $i^{th}$ second touch control electrode 121 in the second touch control electrode array 120, where i is a positive integer and $1 \leq i \leq M2$.

In one embodiment, as shown in FIG. 3, the plurality of first sub-electrodes 112 in the first touch control electrode array 110 may be one-to-one corresponding to the plurality of the second sub-electrodes 122 in the second touch control electrode array 120. That is, M1=M2, and N1=N2. To form capacitors for detecting touch positions, an orthogonal projection of the first sub-electrode 112 onto the second touch control electrode array 120 may cover the corresponding second sub-electrode 122, and/or an orthogonal projection of the second sub-electrode 122 onto the first touch control electrode array 110 may cover the corresponding first sub-electrode 112. That is, the first sub-electrode 112 in the first touch control electrode array 110 may be overlapped with the corresponding second sub-electrode 122 in the second touch control electrode array 120, forming a plurality of capacitors for detecting touch positions. In other words, any first sub-electrodes 112 in the first touch control electrode array 110 may be overlapped with the corresponding second sub-electrode 122 in the second touch control electrode array 120, forming a plurality of capacitors for detecting touch positions.

In another embodiment, M1≠M2 and/or N1≠N2, for example, M1=2M2, and N1=2N2. That is, a 2×2 sub array of first touch control electrodes (i.e., four first sub-electrodes arranged in a 2×2 sub array) may correspond to one second touch control sub-electrode, and an orthogonal projection of the 2×2 sub array of first touch control electrodes 112 onto the second touch control electrode array 120 may cover one second sub-electrode 122, and/or an orthogonal projection of one second sub-electrode 122 onto the first touch control electrode array 110 may cover the 2×2 sub array of first touch control electrodes 112.

The first touch control electrode 111 and the second touch control electrode 121 may have various shapes according to different application scenarios. In one embodiment, as in FIGS. 1-3, the second touch control electrode 121 may be a stripe-shaped electrode used in the current technologies. That is, in each second touch control electrode 121, the second sub-electrodes 122 may be referred as a part overlapping with the first sub-electrodes 112, while the second connector 123 may be referred as a part connecting the second sub-electrodes 122 which are overlapping with the first sub-electrodes 112. The first touch control electrode 111 may have a hybrid shape, in which the first sub-electrode 112 may have a circular shape, and the first connector 113 may have a rectangular shape.

In another embodiment, the first touch control electrode may be a stripe-shaped electrode used in the current technologies, while the second touch control electrode may have a hybrid shape similar to the first touch control electrode in FIG. 2. In particular, in the second direction D2, the width of the second sub-electrode may be larger than the width of the second connector.

Figure 4:
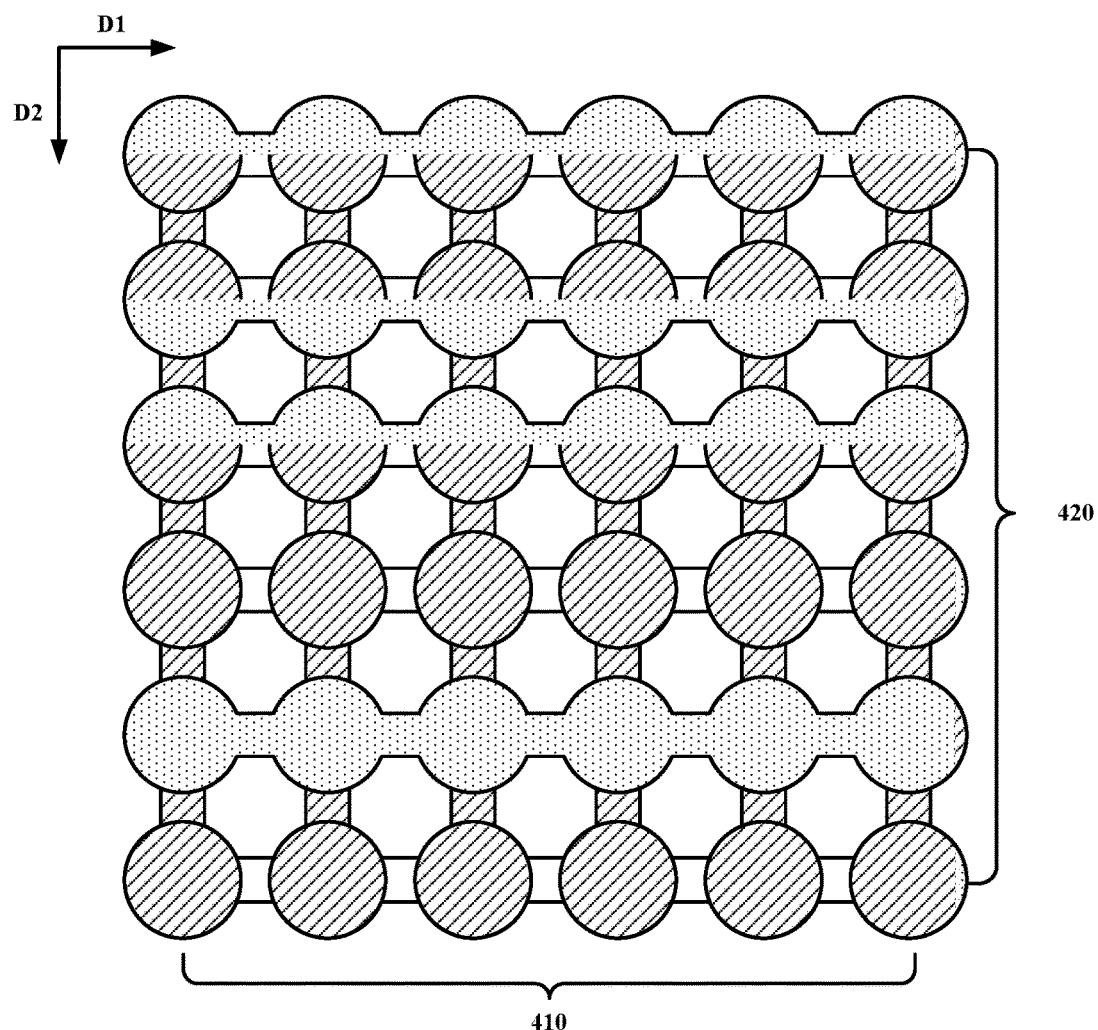
FIG. 4 illustrates another exemplary arrangement of a first touch control electrode array and a second touch control electrode array in an exemplary touch control display panel consistent with disclosed embodiments.

In another embodiment, both the first touch control electrodes and the second touch control electrodes may have a hybrid shape similar to the first touch control electrode in FIG. 2. The corresponding structure is shown in FIG. 4. FIG. 4 illustrates another exemplary arrangement of a first touch control electrode array and a second touch control electrode array in an exemplary touch control display panel consistent with disclosed embodiments. The similarities between FIG. 3 and FIG. 4 are not repeated here, while certain differences may be explained.

As shown in FIG. 4, a first touch control electrode array 410 may include a plurality of first touch control electrodes arranged in the first direction D1, and a second touch control electrode array 420 may include a plurality of second touch control electrodes arranged in the second direction D2. The first touch control electrode and the second touch control electrode may have a hybrid shape similar to the first touch control electrode 111 in FIG. 2. In particular, in the first direction D1, the width of the first sub-electrode may be larger than the width of the first connector, and in the second direction D2, the width of the second sub-electrode may be larger than the width of the second connector.

In the disclosed embodiments, the first touch control electrode array may include a plurality of first touch control electrodes arranged in the first direction D1, and the second touch control electrode array may include a plurality of second touch control electrodes arranged in the second direction D2. Each first touch control electrode may include a plurality of first sub-electrodes and a plurality of first connectors, and each second touch control electrode may include a plurality of second sub-electrodes and a plurality of second connectors.

Further, the first touch control electrode and/or the second touch control electrode may have a hybrid shape. On one hand, the area of the first touch control electrode and/or the area of the second touch control electrode may be reduced, while the touch sensitivity may substantially remain the same. Thus, the image performance of the touch control display panel may be improved. On the other hand, provided that the area of the first touch control electrode and the area of the second touch control electrode may substantially remain the same, the touch accuracy may be improved and, accordingly, the touch positions may be more precisely identified.

Figure 5:
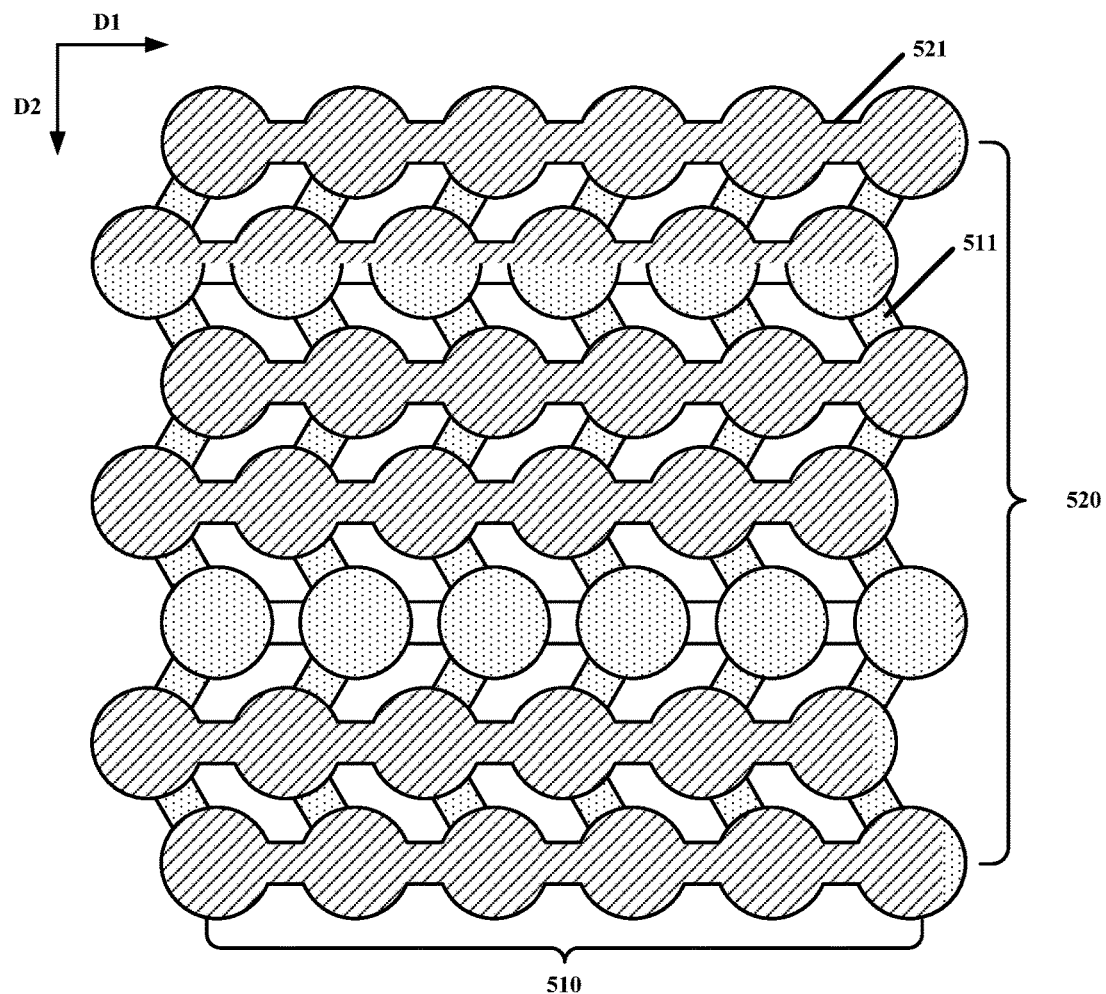
FIG. 5 illustrates another exemplary arrangement of a first touch control electrode array and a second touch control electrode array in an exemplary touch control display panel consistent with disclosed embodiments.
Figure 6:
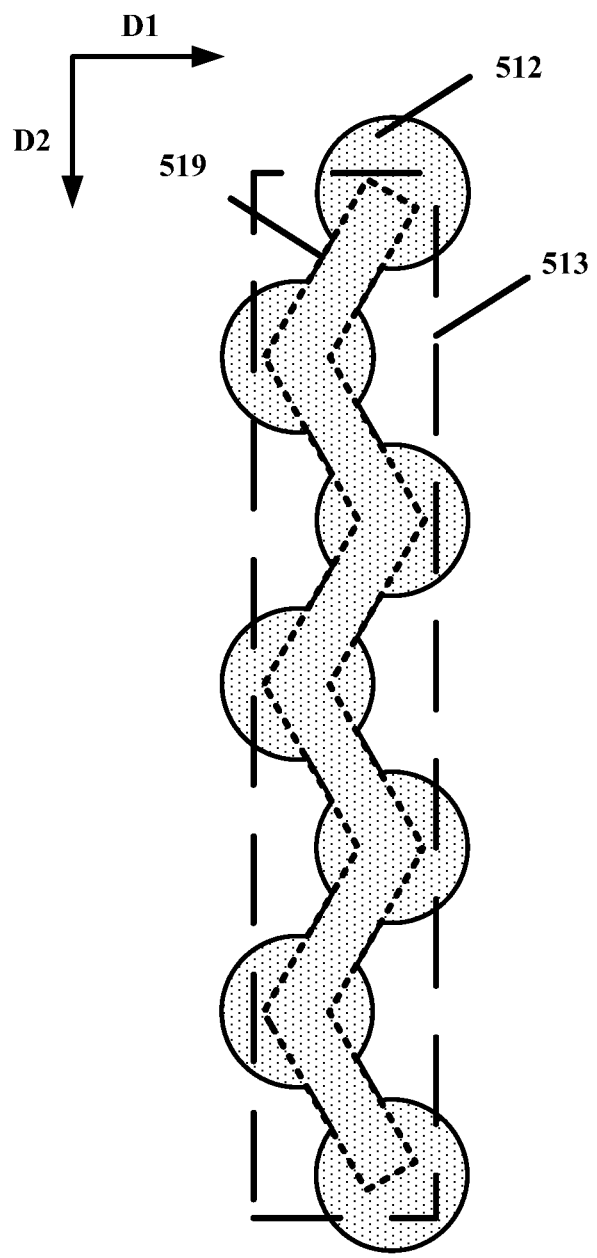
FIG. 6 illustrates a top view of another exemplary first touch control electrode array in FIG. 5 consistent with disclosed embodiments.
Figure 7:
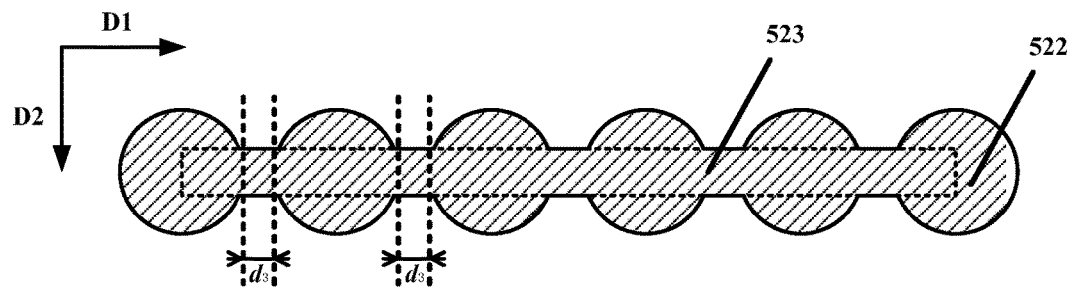
FIG. 7 illustrates a top view of another exemplary second touch control electrode array in FIG. 5 consistent with disclosed embodiments.

FIG. 5 illustrates another exemplary arrangement of a first touch control electrode array and a second touch control electrode array in an exemplary touch control display panel consistent with disclosed embodiments. FIG. 6 illustrates a top view of another exemplary first touch control electrode array in FIG. 5 consistent with disclosed embodiments. FIG. 7 illustrates a top view of another exemplary second touch control electrode array in FIG. 5 consistent with disclosed embodiments. The similarities between FIGS. 1-3 and FIGS. 5-7 are not repeated here, while certain differences may be explained below.

As shown in FIG. 5, the touch control panel display may include a first touch control electrode array 510 and a second touch control electrode array 520. The first touch control electrode array 510 may include a plurality of first touch control electrodes 511 arranged in the first direction D1. The second touch control electrode array 520 may include a plurality of second touch control electrodes 521 arranged in the second direction D2. The first touch control electrodes 511 may be arranged in parallel, and the second touch control electrodes 521 may also be arranged in parallel.

Referring to FIG. 5 and FIG. 6, the first touch control electrode array 510 may include a plurality of first sub-electrodes 512 arranged in an M1×N1 array and a plurality of first connectors 513. Each first connector 513 may connect the first sub-electrodes 512 in the $j^{th}$ column to form the $j^{th}$ first touch control electrode 511 in the first touch control electrode array 510, where j is a positive integer and 1≤j≤N1. That is, the number of the first connectors 513 in the first touch control electrode array 510 may be N1.

Referring to FIG. 5 and FIG. 7, the second touch control electrode array 520 may include a plurality of second sub-electrodes 522 arranged in an M2×N2 array, and a plurality of second connectors 523. The number of the second connectors 523 may be M2. Each second connector 523 may connect the second sub-electrodes 522 in the $i^{th}$ row to form the $i^{th}$ second touch control electrode 521 in the second touch control electrode array 520, where i is a positive integer and 1≤i≤M2. In one embodiment, as shown in FIGS. 5-7 M1=M2=M, and N1=N2=N, where M1, M2, M, N1, N2 and N are positive integers, respectively. In another embodiment, M1≠M2 and/or N1≠N2.

Further, the first sub-electrodes 512 in the first touch control electrode array 510 may be one-to-one corresponding to the plurality of the second sub-electrodes 522 in the second touch control electrode array 520. An orthogonal projection of the first sub-electrode 512 onto the second touch control electrode array 510 may cover the corresponding second sub-electrode 522, and/or an orthogonal projection of the second sub-electrode 522 onto the first touch control electrode array 510 may cover the corresponding first sub-electrode 512. That is, the first sub-electrodes 552 in the first touch control electrode array 510 may cover the corresponding second sub-electrodes 522 in the second touch control electrode array 520, forming a plurality of capacitors for detecting touch positions.

Different from the first touch control electrode array in FIGS. 1-3, the first connectors in the same first touch control electrode in the first touch control electrode array in FIGS. 5-7 may no longer form a straight line. In one embodiment, as shown in in FIGS. 5-7, the first connectors 513 in the same first touch control electrode in the first touch control electrode array 510 may form a first fold line 513. Each first fold line 513 may include a plurality of first straight line 519, and each first straight line 519 may connect two adjacent first sub-electrodes 512 in a same first touch control electrode 511. Because the first connectors 513 in the same first touch control electrode form a fold line, the distance between two adjacent first sub-electrodes 512 in the same first touch control electrode 511 may be further reduced. Accordingly, in the second direction D2, the distance between two adjacent second touch control electrodes 521 may also be reduced.

Thus, given a fixed area of the display region in the touch control display panel, the number of the first control electrodes 511 and the number of second touch control electrodes 521 may be increased, and the number of the intersections between the first control electrodes 511 and the second touch control electrodes 521 may be increased accordingly. That is, the number of the capacitors for detecting touch positions may be increased, and the touch accuracy may be improved.

In certain embodiments, in a same first touch control electrode, the first straight line connecting the $k^{th}$ first sub-electrode and the $(k-1)^{th}$ first sub-electrode and the first straight line connecting the $k^{th}$ first sub-electrode and the $(k+1)^{th}$ first sub-electrode may be axially symmetrical with respect to the first direction D1, where $2 \leq k \leq N-1$. Thus, an extending direction of the first touch control electrode may not deviate from the second direction D2, and the corresponding touch control display panel may exhibit a uniform touch accuracy and touch sensitivity across the display region.

Further, as shown in FIG. 7, in the second touch control electrode, the second connectors 523 may form a second straight line. In a same second touch control electrode, any two adjacent second sub-electrode 523 may have an equal distance between them. Thus, in a same second touch control electrode, the second sub-electrodes 523 may be uniformly distributed, and the corresponding touch control display panel may exhibit a uniform touch accuracy and touch sensitivity across the display region.

It should be noted that, as shown in FIGS. 5-6, the first connectors 513 in the same first touch control electrode forms a first fold line, which is for illustrative purposes and are not intended to limit the scope of the present disclosure. The first connectors 513 in the same first touch control electrode may form various shapes according to different application scenarios, such as, a straight line, and a curve, etc.

Figure 8:
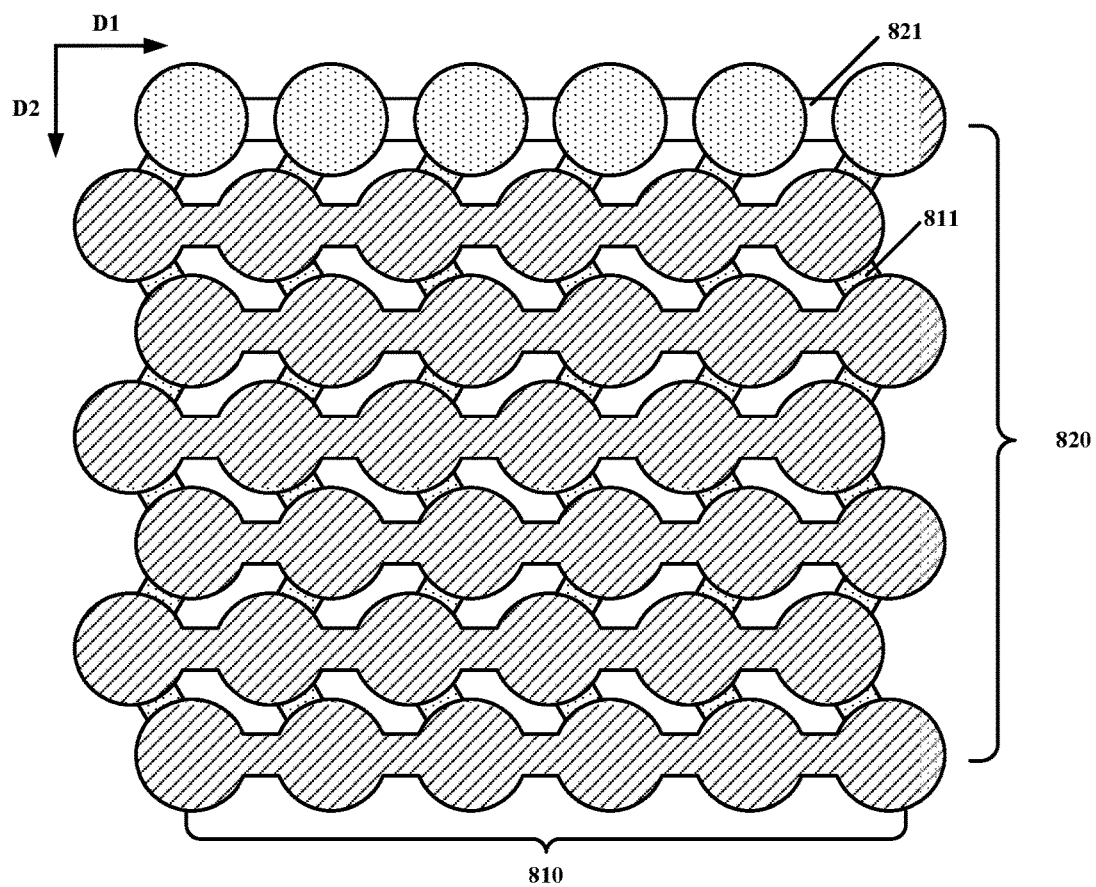
FIG. 8 illustrates another exemplary arrangement of a first touch control electrode array and a second touch control electrode array in an exemplary touch control display panel consistent with disclosed embodiments.
Figure 9:
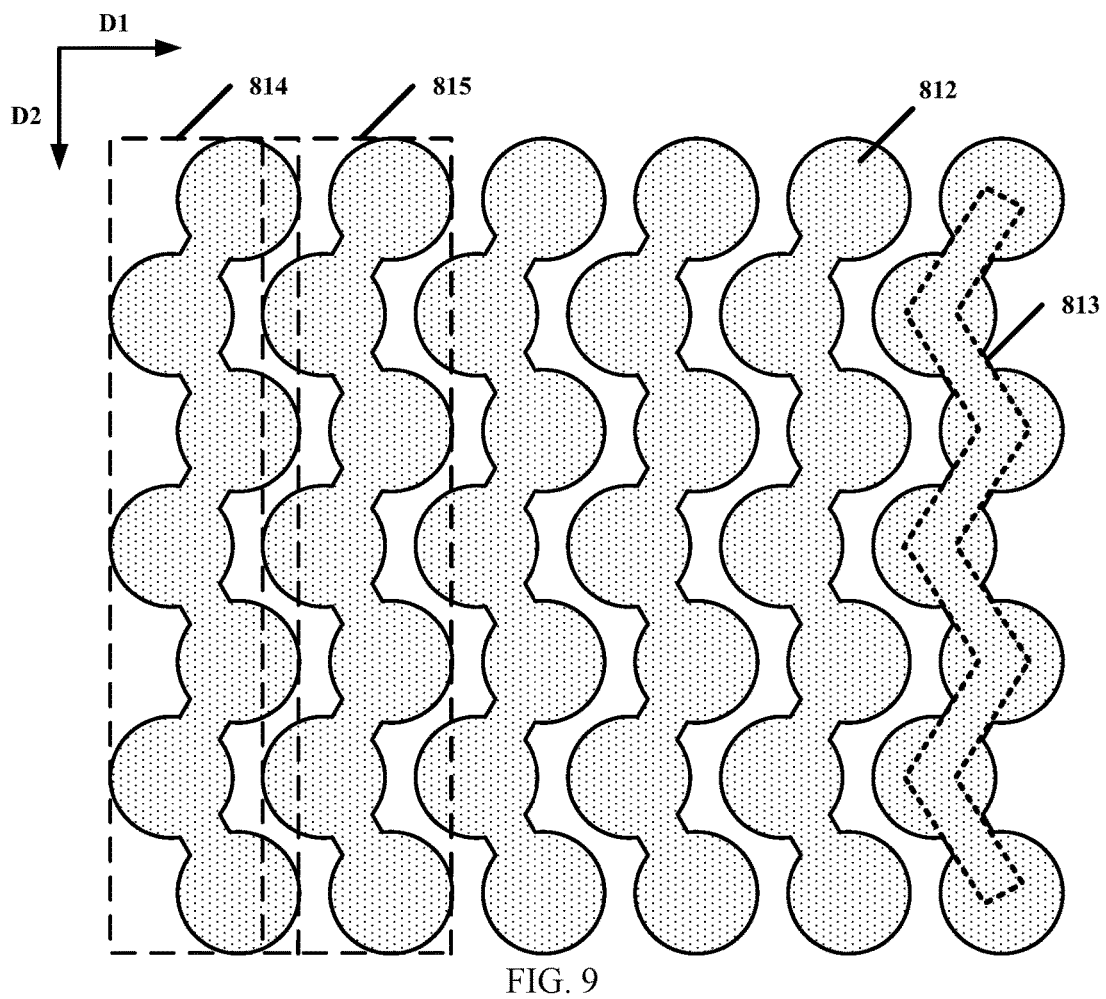
FIG. 9 illustrates a top view of another exemplary first touch control electrode array in FIG. 8 consistent with disclosed embodiments.
Figure 10:
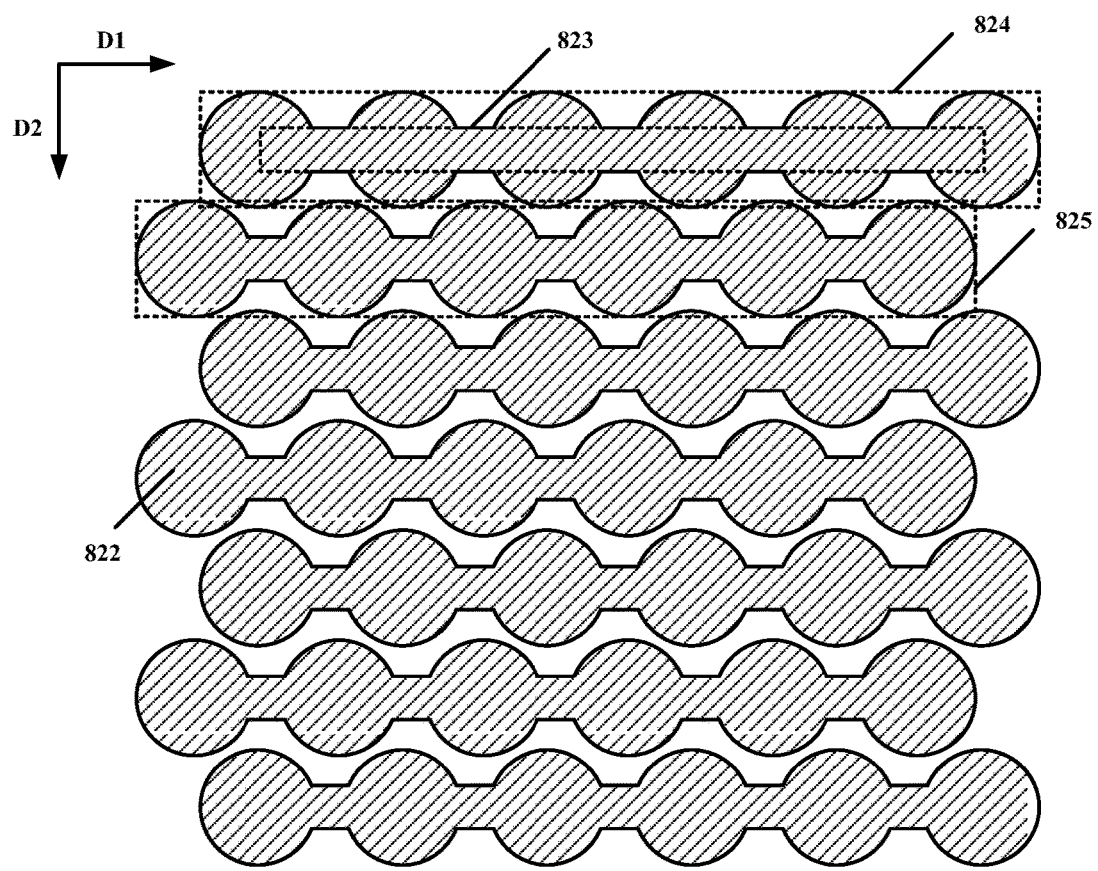
FIG. 10 illustrates a top view of another exemplary second touch control electrode array in FIG. 8 consistent with disclosed embodiments.

FIG. 8 illustrates another exemplary arrangement of a first touch control electrode array and a second touch control electrode array in an exemplary touch control display panel consistent with disclosed embodiments. FIG. 9 illustrates a top view of another exemplary first touch control electrode array in FIG. 8 consistent with disclosed embodiments. FIG. 10 illustrates a top view of another exemplary second touch control electrode array in FIG. 8 consistent with disclosed embodiments. The similarities between FIGS. 5-7 and FIGS. 8-10 are not repeated here, while certain differences may be explained.

As shown in FIG. 8, the touch control panel display may include a first touch control electrode array 810 and a second touch control electrode array 820. The first touch control electrode array 810 may include a plurality of first touch control electrodes 811 arranged in the first direction D1. The second touch control electrode array 820 may include a plurality of second touch control electrodes 821 arranged in the second direction D2. The first touch control electrodes 811 may be arranged in parallel, and the second touch control electrodes 821 may also be arranged in parallel.

Referring to FIG. 8 and FIG. 9, the first touch control electrode array 810 may include a plurality of first sub-electrodes 812 arranged in an M1×N1 array, and a plurality of first connectors 813. Each first connector 813 may connect the first sub-electrodes 812 in the $j^{th}$ column to form the $j^{th}$ first touch control electrode 811 in the first touch control electrode array 810, where j is a positive integer and $1 \leq j \leq N1$. The number of the first connectors 813 may be N1.

Referring to FIG. 8 and FIG. 10, the second touch control electrode array 820 may include a plurality of second sub-electrodes 822 arranged in an M2×N2 array, and a plurality of second connectors 823. Each second connector 823 may connect the second sub-electrodes 822 in the $i^{th}$ row to form the $i^{th}$ second touch control electrode 821 in the second touch control electrode array 820, where i is a positive integer and $1 \leq i \leq M2$. That is, the number of the second connectors 823 may be M2. In one embodiment, as shown in FIGS. 8-10 M1=M2=M, and N1=N2=N, where M1, M2, M, N1, N2 and N are positive integers, respectively. In another embodiment, M1≠M2 and/or N1≠N2.

Further, referring to FIGS. 8-10, the first sub-electrodes 812 in the first touch control electrode array 810 may be one-to-one corresponding to the plurality of the second sub-electrodes 822 in the second touch control electrode array 820. An orthogonal projection of the first sub-electrode 812 onto the second touch control electrode array 810 may cover the corresponding second sub-electrode 822, and/or an orthogonal projection of the second sub-electrode 822 onto the first touch control electrode array 810 may cover the corresponding first sub-electrode 812. That is, the first sub-electrodes 882 in the first touch control electrode array 810 may cover the corresponding second sub-electrodes 822 in the second touch control electrode array 820, forming a plurality of capacitors for detecting touch positions.

Similar to the touch control display panel in FIG. 6, the first connectors 813 in the same first touch control electrode in the touch control display panel in FIG. 9 may also form a first fold line. However, in the first direction D1, the minimum enclosing rectangle (MER) of the first touch control electrode may be partially overlapped with the MER of the adjacent first touch control electrode. As shown in FIG. 9, in the first direction D1, the minimum enclosing rectangle (MER) 814 of the first touch control electrode may be partially overlapped with the MER 815 of the adjacent first touch control electrode.

Meanwhile, in the second direction D2, the minimum enclosing rectangle (MER) of the second touch control electrode may be partially overlapped with the MER of the adjacent second touch control electrode. As shown in FIG. 10, in the second direction D2, the minimum enclosing rectangle (MER) 824 of the second touch control electrode may be partially overlapped with the MER 825 of the adjacent second touch control electrode.

Because the MERs of two adjacent first touch control electrodes may be partially overlapped, the first touch control electrodes may be arranged more closely to each other on the touch control display panel. Similarly, because the MERs of two adjacent second touch control electrodes may be partially overlapped, the second touch control electrodes may be arranged more closely to each other on the touch control display panel.

Thus, given a fixed area of the display region in the touch control display panel, the number of the capacitors formed between the first touch control electrodes and the second touch control electrodes may be further increased. That is, the number of the capacitors used for detecting touch positions may be further increased. Accordingly, the touch accuracy may be further improved.

In the disclosed embodiments, the second sub-electrode and/or the first sub-electrode may have a polygonal shape, a circular shape, or an elliptical shape. The second sub-electrode and the first sub-electrode may have the same shape or different shapes. The shape and the number of the second sub-electrode and the first sub-electrode in FIGS. 1-10 are illustrative purposes and are not intended to limit the scope of the present disclosure.

Further, the first direction D1 and the second direction D2 shown in FIGS. 1-10 are for illustrative purposes and are not intended to limit the scope of the present disclosure. In one embodiment, the first direction D1 may be perpendicular to the second direction D2. In another embodiment, the first direction D1 may be no longer perpendicular to the second direction D2.

In one embodiment, the first sub-electrodes and the first connectors may be disposed in a same layer, and the second sub-electrodes and the second connectors may be disposed in a same layer. In another embodiment, the first sub-electrodes and the first connectors may be disposed in different layers, and/or the second sub-electrodes and the second connectors may be disposed in different layers.

In one embodiment, the first touch control electrodes may be touch driving electrodes, and the second touch control electrodes may be touch sensing electrodes. In another embodiment, the first touch control electrodes may be touch sensing electrodes, and the second touch control electrodes may be touch driving electrodes.

Figure 11:
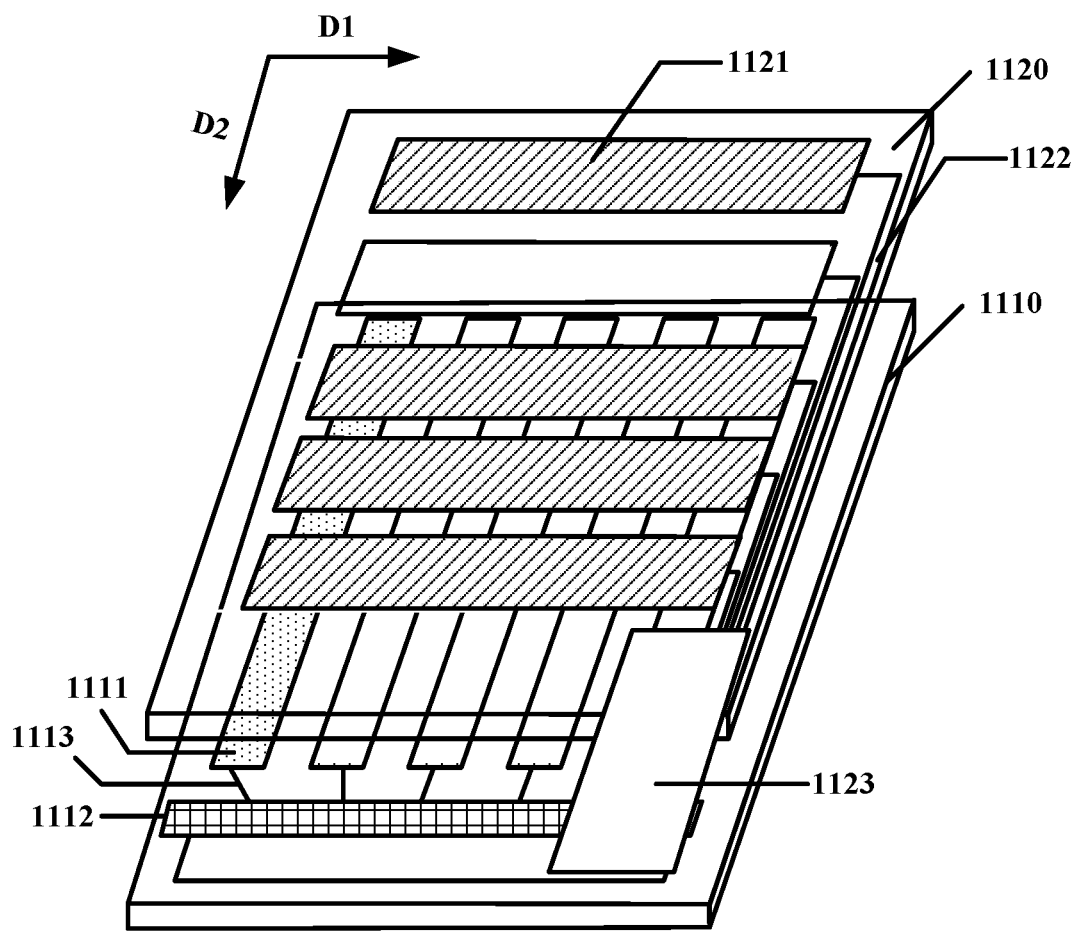
FIG. 11 illustrates an exemplary touch control display panel consistent with disclosed embodiments.

FIG. 11 illustrates an exemplary touch control display panel consistent with disclosed embodiments. As shown in FIG. 11, the touch display panel may include an array substrate 1110, a color film substrate 1120 arranged opposite to the array substrate 1110, display medium (not drawn in FIG. 11) sandwiched between the array substrate 1110 and the color film substrate 1120, a touch driving electrode array include a plurality of touch driving electrodes 1111, a touch sensing electrode array include a plurality of touch sensing electrodes 1121, a first integrated circuit 1112, a plurality of touch scanning signal lines 1113, and a plurality of touch sensing signal lines 1122. Other components may also be included.

An inner surface of the array substrate 1110 may be facing an inner surface of the color film substrate 1120. The first integrated circuit 1112 may be any appropriate display controlling circuits, touch scanning circuits and/or touch sensing circuits of the touch control display panel. The display medium may be any appropriate display medium capable of displaying videos and/or images. In one embodiment, the display medium may be liquid crystal materials. In another embodiment, the display medium may be plasma display panel (PDP) display medium, field emission display (FED) display medium, organic light-emitting diode (OLED) display medium, light-emitting diode (LED) display medium, quantum dots (QDs) display medium, or electrophoretic display medium.

The touch driving electrode array including the plurality of touch driving electrodes 1111 may be disposed on the array substrate 1110, and the touch sensing electrode array including the plurality of touch sensing electrodes 1121 may be disposed on the color film substrate 1120. The touch driving electrode array and the touch sensing electrode array may have any disclosed arrangement and structures.

In one embodiment, the touch sensing electrodes 1121 may be disposed on a surface of the color film substrate 1120 far away from the array substrate 1110, for example, the touch sensing electrodes 1121 may be disposed on the outer surface of the color film substrate 1120. Meanwhile, the touch driving electrodes 1111 may be disposed on a surface of the array substrate 1110 facing the color film substrate 1120, for example, the touch driving electrodes 1111 may be disposed on the inner surface of the array substrate 1110. That is, the touch control display panel may be a hybrid-cell touch control display panel. In another embodiment, the touch control display panel may be an in-cell touch control display panel. In another embodiment, the touch control display panel may be an on-cell touch control display panel.

Figure 12:
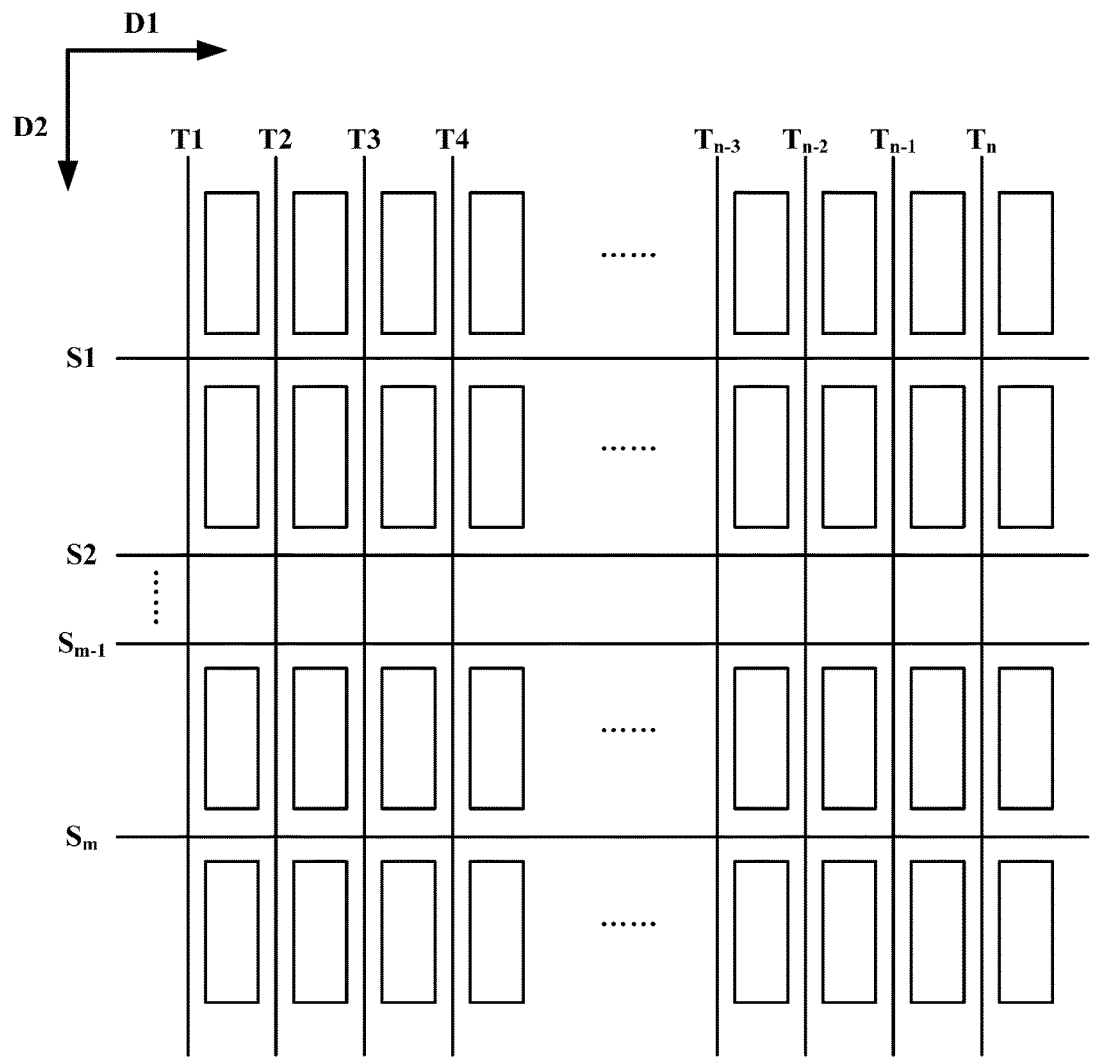
FIG. 12 illustrates exemplary scanning lines and exemplary data lines in an exemplary touch control display panel in FIG. 11 consistent with disclosed embodiments.

Further, the array substrate 1110 may also include a plurality of scanning lines and a plurality of data lines. The corresponding structure is shown in FIG. 12. FIG. 12 illustrates exemplary scanning lines and exemplary data lines in an exemplary touch control display panel in FIG. 11 consistent with disclosed embodiments.

As shown in FIG. 12, the array substrate may include a plurality of scanning lines S1-Sm and a plurality of data lines T1-Tn. The scanning lines S1-Sm may intersect or cross the data lines T1-Tn to form a pixel array. The scanning lines may extend in the first direction D1, and the data lines may extend in the second direction D2. That is, referring to FIG. 11 and FIG. 12, the touch driving electrodes 1111 may extend in the same direction as the data lines T1-Tn, and the touch sensing electrode 1121 may extend in the same direction as the scanning lines S1-Sm.

Returning to FIG. 11, each touch scanning signal line 1113 may have a first end electrically connected to the corresponding touch driving electrode 1111, and a second end electrically connected to the first integrated circuit 1112. Similarly, each touch sensing signal line 1122 may have a first end electrically connected to the corresponding touch sensing electrode 1121, and a second end electrically connected to the first integrated circuit 1112.

When the touch sensing signal lines 1122 are disposed on the color film substrate 1120, while the first integrated circuit 1112 is disposed on the array substrate 1110, to realize the electrical connection between the touch sensing signal lines 1122 and the first integrated circuit 1112, a flexible printed circuit (FPC) 1123 may be provided to electrically connect the touch sensing signal lines 1122 and the first integrated circuit 1112.

In a touch stage, the first integrated circuit 1112 may provide the touch scanning signal to the touch driving electrodes 1111 and, meanwhile, receive the touch sensing signal from the touch sensing electrodes 1121. For example, in the touch stage, the first integrated circuit 1112 may sequentially provide the touch scanning signal to each touch driving electrode 1111, while simultaneously collect the touch sensing signals from all the touch sensing electrodes 1121. According to the various touch sensing signals received from the touch sensing electrodes 1121, the first integrated circuit 1112 may identify the touch position.

In one embodiment, the touch sensing signal lines 1122 and the touch sensing electrodes 1121 may be disposed in a same conductive layer. In another embodiment, the touch sensing signal lines 1122 and the touch sensing electrodes 1121 may be disposed in different conductive layers, and each touch sensing signal line 1122 may be directly electrically connected to the corresponding touch sensing electrode 1121.

In another embodiment, the touch sensing signal lines 1122 and the touch sensing electrodes 1121 may be disposed in different conductive layers, and each touch sensing signal line 1122 may be indirectly electrically connected to the corresponding touch sensing electrode 1121, e.g., via a through-hole disposed in an insulating layer between the conductive layer having the touch sensing signal lines 1122 and the conductive layer having the touch sensing electrodes 1121.

In one embodiment, in a display stage, the touch driving electrodes 1111 may be multiplexed as a common electrode, for example, through a time-divisional driving method, the first integrated circuit 1112 may also provide a common voltage signal to each touch driving electrode 1111. Thus, the liquid crystal molecules in the liquid crystal display medium (not drawn in FIG. 11), which are sandwiched between the array substrate 1110 and the color film substrate 1120, may be deflected under an electric filed generated between the common electrode and pixel electrodes. Accordingly, predetermined images may be displayed on the touch control display panel. In another embodiment, the touch driving electrodes 1111 may not be multiplexed as a common electrode, i.e., the touch driving electrodes 1111 may be different from the common electrode.

Figure 13:
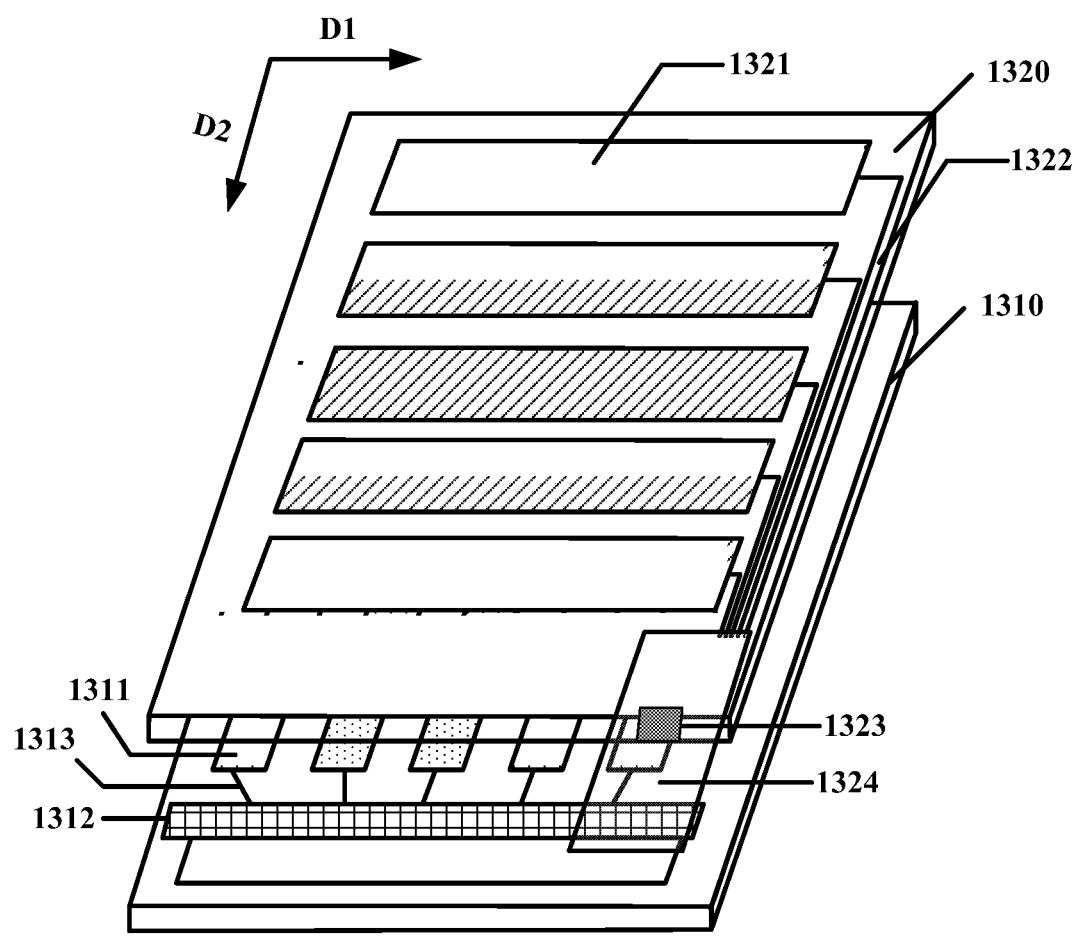
FIG. 13 illustrates another exemplary touch control display panel consistent with disclosed embodiments.

FIG. 13 illustrates an exemplary touch control display panel consistent with disclosed embodiments. The similarities between FIG. 13 and FIG. 11 are not repeated here, while certain differences may be explained.

As shown in FIG. 13, the touch display panel may include an array substrate 1310 and a color film substrate 1320 arranged opposite to the array substrate 1310. A touch driving electrode array including a plurality of touch driving electrodes 1311 may be disposed on the array substrate 1310, and a touch sensing electrode array including a plurality of touch sensing electrodes 1321 may be disposed on the color film substrate 1320. The touch driving electrode array and the touch sensing electrode array may have any disclosed arrangement and structures.

In one embodiment, the touch sensing electrodes 1321 may be disposed on a surface of the color film substrate 1320 far away from the array substrate 1310, for example, the touch sensing electrodes 1321 may be disposed on the outer surface of the color film substrate 1320. Meanwhile, the touch driving electrodes 1311 may be disposed on a surface of the array substrate 1310 facing the color film substrate 1320, for example, the touch driving electrodes 1311 may be disposed on the inner surface of the array substrate 1310. That is, the touch control display panel may be a hybrid-cell touch control display panel. In another embodiment, the touch control display panel may be an in-cell touch control display panel. In another embodiment, the touch control display panel may be an on-cell touch control display panel.

Different from the touch control display panel in FIG. 11, the touch control display panel in FIG. 13 may include two integrated circuits, i.e., a first integrated circuit 1312 and a second integrated circuit 1323, to realize the function of the first integrated circuit 1112 in FIG. 11. The first integrated circuit 1312 and the second integrated circuit 1323 may be any appropriate display controlling circuits and/or touch scanning circuits and/or touch sensing circuits of the touch control display panel. In particular, each touch scanning signal line 1313 may have a first end electrically connected to the corresponding touch driving electrode 1313, and a second end electrically connected to the first integrated circuit 1312. Similarly, each touch sensing signal line 1322 may have a first end electrically connected to the corresponding touch sensing electrode 1321, and a second end electrically connected to the second integrated circuit 1323.

The second integrated circuit 1323 may transmit the collected touch sensing signals to the first integrated circuit 1312 through a flexible printed circuit (FPC) 1324. Based on the received touch sensing signals, the first integrated circuit 1312 may identify the touch positions. The second integrated circuit 1323 and the first integrated circuit 1312 may realize different functions and, thus, the workload of each integrated circuit may be reduced, and the probability of failure of the integrated circuits may be reduced.

As discussed above, in the touch control display panel in FIG. 13, the second integrated circuit 1323 may be disposed on the FPC 1324, and may transmit the collected touch sensing signals to the first integrated circuit 1312 through the FPC 1324. However, the position of the second integrated circuit 1323 in FIG. 13 is for illustrative purposes and is not intended to limit the scope of the present disclosure. In certain embodiments, the second integrated circuit may be disposed on the array substrate or the color film substrate, and the touch sensing signals may be transmitted to the first integrated circuit through the second integrated circuit and the FPC.

It should be noted that, FIG. 11 and FIG. 13 show the touch driving electrodes 1111 are disposed on the array substrate 1110, while the touch sensing electrodes 1121 are disposed on the color film substrate 1120, which is for illustrative purposes and are not intended to limit the scope of the present disclosure. In practical applications, the position of the touch driving electrodes and the touch sensing electrodes may be configured according to various application scenarios. In one embodiment, both the touch driving electrodes and the touch sensing electrodes may be disposed on the array substrate.

In another embodiment, both the touch driving electrodes and the touch sensing electrodes may be disposed on the color film substrate. In another embodiment, the touch driving electrodes and/or the touch sensing electrodes may be disposed on another appropriate substrate different from the array substrate and color film substrate, for example, when the display medium is OLED display medium, the ouch driving electrodes and the touch sensing electrodes may be disposed on a cover glass plate.

Figure 14:
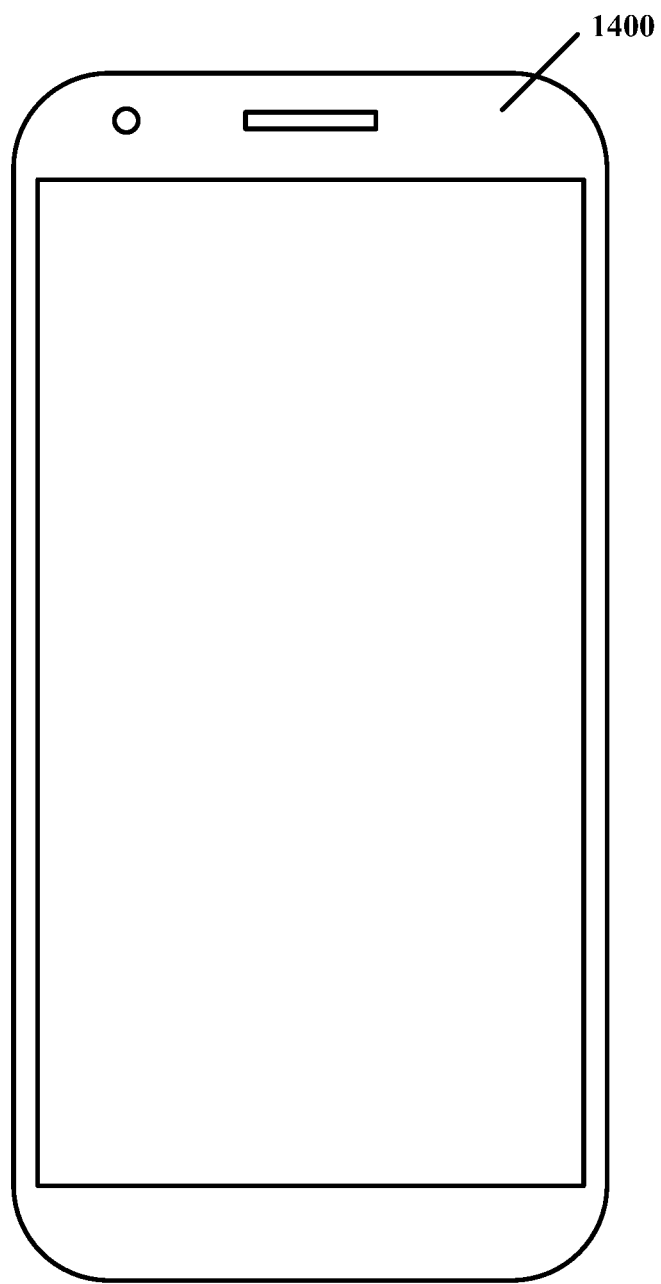
FIG. 14 illustrates an exemplary display device consistent with disclosed embodiments.

The present disclosure further provides an improved display device including any of the disclosed touch control display panels. FIG. 14 illustrates an exemplary display device consistent with disclosed embodiments. The display device 1400 may comprise any of the disclosed touch control display panels. Other components may also be included. Although the display device 1400 shown in FIG. 14 is a smart phone, the display device 1400 may be a smart wearable device, a tablet, a TV, a smartphone, a notebook, and, a digital frame, etc. Further, the display device may be any appropriate type of content-presentation devices. Because the display device may comprise any of the disclosed touch control display panels, the display device may also exhibit the same advantages as the disclosed touch control display panels, which are not repeated here.

In the disclosed embodiments, the intersection areas between the first touch control electrodes and the second touch control electrodes may be expanded, while the non-intersection areas between the first touch control electrodes and the second touch control electrodes may be reduced. Thus, given a fixed area of the first touch control electrodes and the second touch control electrodes, i.e., given a fixed area of the display region, the number of the capacitors for detecting touch positions may be increased. Accordingly, the touch accuracy may be improved.

Further, in certain embodiments, the minimum enclosing rectangle (MER) of two adjacent first touch control electrodes may be partially overlapped, and the MERs of two adjacent second touch control electrodes may be partially overlapped. Thus, the first touch control electrodes may be arranged more closely to each other on the touch control display panel, and the second touch control electrodes may be arranged more closely to each other on the touch control display panel.

Thus, given a fixed area of the display region in the touch control display panel, the number of the capacitors formed between the first touch control electrodes and the second touch control electrodes may be further increased. That is, the number of the capacitors used for detecting touch positions may be further increased. Accordingly, the touch accuracy may be further improved.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A touch control display panel, comprising:
    a first touch control electrode array including a plurality of first sub-electrodes arranged in an M1×N1 array and a plurality of first connectors, wherein the first touch control electrode array includes a plurality of first touch control electrodes arranged in a first direction, a first connector connects the first sub-electrodes in a $j^{th}$ column to form a $j^{th}$ first touch control electrode in the first touch control electrode array, where j is a positive integer and $1 \leq j \leq N1$; and
    a second touch control electrode array including a plurality of second sub-electrodes arranged in an M2×N2 array and a plurality of second connectors, wherein the second touch control electrode array includes a plurality of second touch control electrodes arranged in a second direction, and a second connector connects the second sub-electrodes in an $i^{th}$ row to form an $i^{th}$ second touch control electrode in the second touch control electrode array, where i is a positive integer and $1 \leq i \leq M2$, M1, M2, N1, and N2 are positive integers, respectively,
    wherein the first touch control electrode array and the second touch control electrode array are configured to satisfy at least one of:
    in the first direction, a width of the first sub-electrode being larger than a width of the first connector, and
    in the second direction, a width of the second sub-electrode being larger than a width of the second connector,
    wherein the first connectors in a same first touch control electrode form a first fold line, the first fold line includes a plurality of first straight lines, and a first straight line connects two adjacent first sub-electrodes in the same first touch control electrode, such that the first sub-electrodes in two adjacent rows are staggered in the second direction.

2. The touch control display panel according to claim 1, wherein:
    the first touch control electrode array and the second touch control electrode array are configured to satisfy at least one of:
    an orthogonal projection of the first sub-electrode onto the second touch control electrode array covers the second sub-electrode, and
    an orthogonal projection of the second sub-electrode onto the first touch control electrode array covers the first sub-electrode.

3. The touch control display panel according to claim 1, wherein:
    M1=M2=M; and N1=N2=N, where M1, M2, M, N1, N2, and N are positive integers, respectively.

4. The touch control display panel according to claim 1, wherein:
    the first sub-electrodes and the first connectors are disposed in a first conductive layer; and
    the second sub-electrodes and the second connectors are disposed in a second conducive layer different from the first conductive layer.

5. The touch control display panel according to claim 1, wherein:
    in the same first touch control electrode, the first straight line connecting a $k^{th}$ first sub-electrode and a $(k-1)^{th}$ first sub-electrode and the first straight line connecting the $k^{th}$ first sub-electrode and a $(k+1)^{th}$ first sub-electrode is axially symmetrical with respect to the first direction, where $2 \leq k \leq N-1$.

6. The touch control display panel according to claim 1, wherein:
    in a same second touch control electrode, the second connectors form a second straight line; and
    in the same second touch control electrode, a distance between two adjacent second sub-electrodes is the same.

7. The touch control display panel according to claim 1, wherein:
    in the first direction, a minimum enclosing rectangle (MER) of the first touch control electrode is partially overlapped with a MER of an adjacent first touch control electrode.

8. The touch control display panel according to claim 7, wherein:
    in the second direction, a minimum enclosing rectangle (MER) of the second touch control electrode is partially overlapped with a MER of an adjacent second touch control electrode.

9. The touch control display panel according to claim 1, wherein:
at least one of the second sub-electrode and the first sub-electrode has a polygonal shape, a circular shape, or an elliptical shape.

10. The touch control display panel according to claim 1, wherein:
one of the first touch control electrode and the second touch control electrode is a touch driving electrode, and
the other of the first touch control electrode and the second touch control electrode is a touch sensing electrode.

11. The touch control display panel according to claim 10, further including:
a color film substrate disposed with a plurality of touch driving electrodes; and
an array substrate disposed with a plurality of touch sensing electrodes, a plurality of scanning lines extending in the first direction, and a plurality of data lines extending in the second direction and intersecting the data lines.

12. The touch control display panel according to claim 10, further including:
a plurality of touch sensing signal lines disposed in a same layer as the touch sensing electrodes, wherein a touch sensing signal line has a first end electrically connected to a corresponding touch sensing electrode.

13. The touch control display panel according to claim 12, further including:
a first integrated circuit controlling the touch control display panel; and
a plurality of touch scanning signal lines, wherein a touch scanning signal line has a first end electrically connected to a corresponding touch driving electrode, and a second end electrically connected to the first integrated circuit.

14. The touch control display panel according to claim 13, wherein:
in a display stage, the first integrated circuit provides a common voltage signal to the touch driving electrodes and the touch driving electrodes are multiplexed as a common electrode; and
in a touch stage, the first integrated circuit provides a touch scanning signal to the touch driving electrodes.

15. The touch control display panel according to claim 14, wherein:
the first integrated circuit receives a touch sensing signal collected by the touch sensing electrodes.

16. The touch control display panel according to claim 14, further including:
a second integrated circuit receiving a touch sensing signal collected by the touch sensing electrode.

17. A display device comprising a touch control display panel, wherein the touch control display panel comprises:
a first touch control electrode array including a plurality of first sub-electrodes arranged in an M1×N1 array and a plurality of first connectors, wherein the first touch control electrode array includes a plurality of first touch control electrodes arranged in a first direction, a first connector connects the first sub-electrodes in a $j^{th}$ column to form a $j^{th}$ first touch control electrode in the first touch control electrode array, where j is a positive integer and 1≤j≤N1; and
a second touch control electrode array including a plurality of second sub-electrodes arranged in an M2×N2 array and a plurality of second connectors, wherein the second touch control electrode array includes a plurality of second touch control electrodes arranged in a second direction, and a second connector connects the second sub-electrodes in an $i^{th}$ row to form an $i^{th}$ second touch control electrode in the second touch control electrode array, where i is a positive integer and 1≤i≤M2, M1, M2, N1, and N2 are positive integers, respectively,
wherein the first touch control electrode array and the second touch control electrode array are configured to satisfy at least one of:
in the first direction, a width of the first sub-electrode being larger than a width of the first connector, and
in the second direction, a width of the second sub-electrode being larger than a width of the second connector,
wherein the first connectors in a same first touch control electrode form a first fold line, the first fold line includes a plurality of first straight lines, and a first straight line connects two adjacent first sub-electrodes in the same first touch control electrode, such that the first sub-electrodes in two adjacent rows are staggered in the second direction.

18. The display device according to claim 17, wherein:
the first touch control electrode array and the second touch control electrode array are configured to satisfy at least one of:
an orthogonal projection of the first sub-electrode onto the second touch control electrode array covers the second sub-electrode, and
an orthogonal projection of the second sub-electrode onto the first touch control electrode array covers the first sub-electrode.

19. The display device according to claim 17, wherein:
M1=M2, and N1=N2.

* * * * *